3,352,178
PLANETARY GEARING
Milton F. Lindgren and Victor W. Peterson, Indianapolis, Ind., assignors to General Motors Corporation, Detroit, Mich., a corporation of Delaware
Filed Nov. 15, 1965, Ser. No. 507,849
8 Claims. (Cl. 74—801)

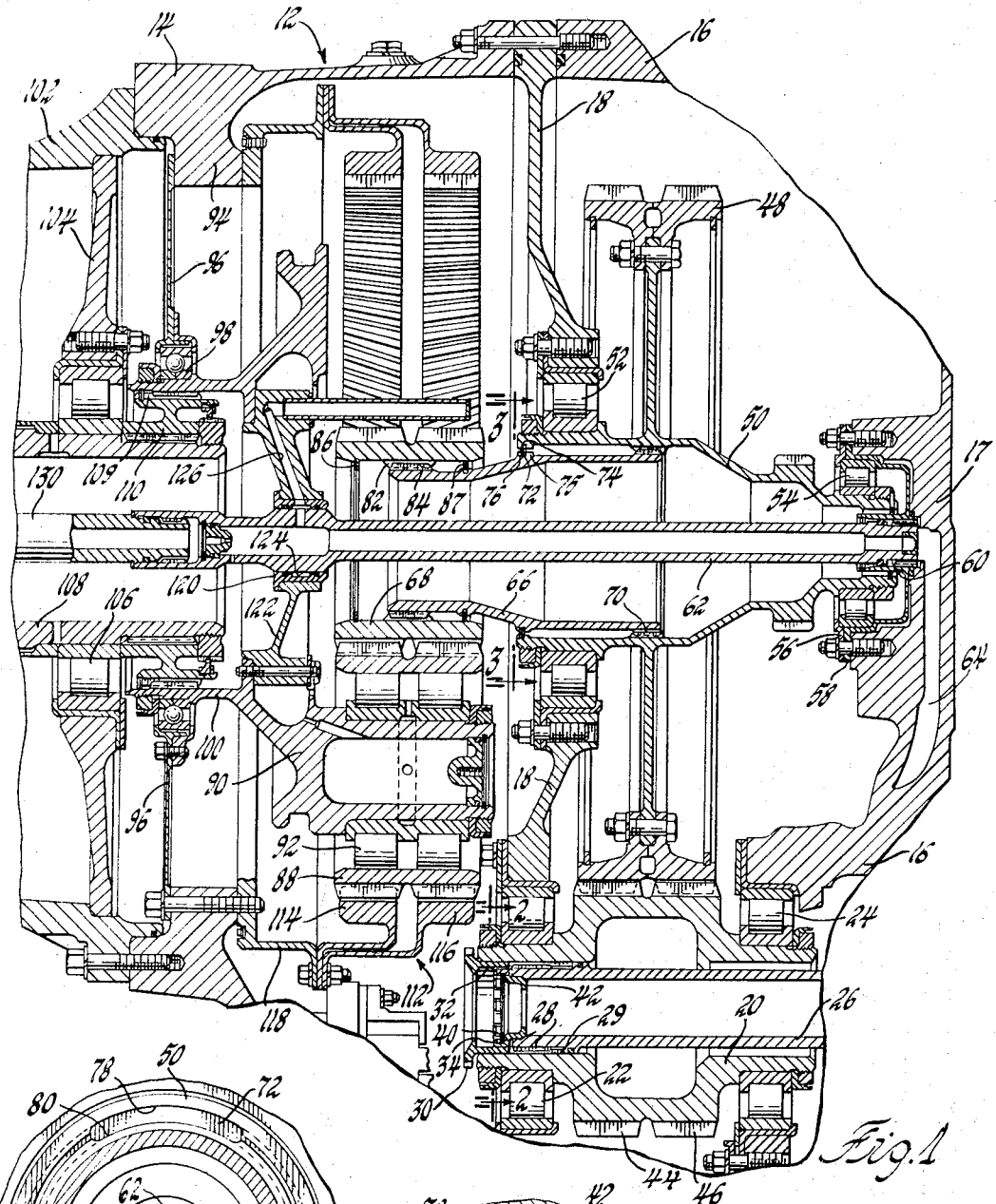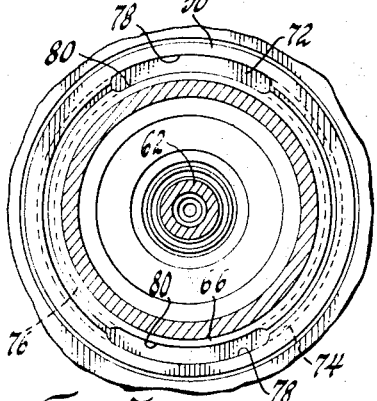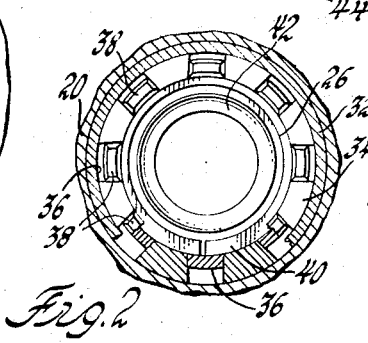

Our invention relates generally to planetary gearing and more particularly to planetary gearing having herringbone or self-aligning type gear teeth. Our planetary gearing is especially suitable for, but not limited to, use as a reduction gear unit between a gas turbine engine and a propeller.

In such a reduction gear unit as in practically all machinery, it is desirable to have the parts capable of axial adjustment. This is desirable among other reasons because the parts will usually experience differential thermal expansion. The differential thermal expansion may be due to use of different materials throughout the gear box unit, different temperature levels at different points in the gear box unit or a variety of reasons. In a reduction gear box for a turboprop, the torque loadings on the gear teeth are usually relatively high and it is desirable to have the axial adjustment made without additionally loading the already highly loaded gear teeth.

Our invention is directed primarily toward providing this capability in a planetary gear set. We are primarily concerned with suitably mounting a planetary gear set of the herringbone or self-aligning type within a housing while at the same time accommodating for differential thermal expansion or axial adjustment of the elements thereof without adding any load to the gear teeth of the gear train.

Other objects and features of the invention will become apparent to those skilled in the art as the disclosure is made in the following detailed description of a preferred embodiment of the invention as illustrated in the accompanying sheet of drawings in which:

FIGURE 1 is a view in cross section of a gear train mounted in its housing in accordance with our invention.

FIGURE 2 is a section taken along the line 2—2 of FIGURE 1 and looking in the direction of the arrows.

FIGURE 3 is a section taken along the line 3—3 of FIGURE 1 and looking in the direction of the arrows.

Our reduction gear includes a housing generally indicated at 12. The housing 12 is made in two main sections 14 and 16 which are bolted together so as to mount a heavy vertical wall 18 between them. A pinion gear 20 has its forward end journaled in a roller bearing 22 mounted in the lower end of the vertical wall 18. The aft end of the pinion gear 20 is journaled in a second roller bearing 24 mounted in the rear vertical wall 17 of the housing 12. Input shaft 26 extends through the wall 17 into the hollow annular pinion gear 20 and is splined to it at its forward end 28. An accessory drive gear 30 is secured to the forward end of the input shaft 28 ahead of the pinion gear 20. The gear 30 meshes with a second gear (not shown) to drive an accessory and as such is a power take-off. The manner of connecting the accessory drive gear 30 to the input shaft 26 can best be understood by reference to FIGURE 2 in connection with FIGURE 1.

As is evident from FIGURE 1, the gear 30 has an integral axially extending portion 32 which has its inner end disposed between the pinion gear 20 and the input shaft 26. Adjacent this inner end is an inwardly extending flange 34 which is castellated to provide circumferentially spaced slots 36. This is best seen in FIGURE 2. Lugs 38 extending axially from the input shaft 26 are disposed in the slots 36 and together with the castellations present a continuous inner circumferential surface. The continuous inner circumferential surface has a radial groove formed by aligned grooves in the individual castellations 34 and the lugs 38. The radial groove receives a snap ring 40 which thus connects the parts. A cuplike member 42 is nested in the input shaft 26 between the snap ring 40 and an internal shoulder on the input shaft 26. The member 42 serves as an oil puddler abutment for the inside of shaft 26.

The gear 32 being connected to the shaft 26 also positively locates pinion gear 20 axially with respect to shaft 26 since the internal splines 28 on the gear 20 are sandwiched between the inner end of the gear 32 and a radial boss 29 on the shaft 26. The shaft 26 in turn is axially fixed with respect to the housing 12 by a thrust bearing (not shown). The pinion gear 20 is seen to comprise a pair of axially spaced circumferential rows of teeth 44 and 46, respectively. The teeth on this gear as well as the teeth on the remaining gears are of the herringbone type, that is, the left row 44 has a lead opposite to the lead of the right row. This gives a self-aligning feature to all of the gears.

The pinion gear 20 meshes with a large main gear 48 which has an integral hollow shaft 50. The shaft 50 carries the inner races of roller bearings 52 and 54 at its forward and aft ends, respectively. The outer race of the roller bearing 52 is mounted in the vertical wall 18 while the outer race of the roller bearing 54 is mounted in the rear housing wall 17. Thus the gear 48 and shaft 50 is journaled in the housing 12. It is fixed axially with respect to the housing 12 by being in mesh with axially fixed pinion 20 through herringbone gear teeth.

Noting the detail of the aft roller bearing mount 54, we see that the outer race is clamped between a pair of members 56 and 58 which are bolted to the rear housing wall 17. The rightmost member 58 is cup shaped and has an integral axial flange 60 at the middle of its bottom wall. The inner surface of flange 60 is splined and receives mating splines on an oil supply tube 62 to nonrotatably mount it. The oil supply tube communicates with an oil supply chamber 64 in the rear wall 17 of the housing 12 with the bottom wall of the cupped member 58 sealingly engaging the back wall 17 to prevent leakage of oil as it flows from chamber 64 into tube 62. The tube 62 extends to the left and is disposed within shaft 50 and a short coupling shaft 66.

The short hollow coupling shaft 66 connects the main gear 48 with a sun gear 68. It is drivingly connected to the main gear shaft 50 by mating internal and external splines 70 on the respective members. The coupling shaft 66 and the main gear shaft 50 are fixed axially by a buried Spiralox snap ring 72 (see FIGURES 1 and 3). The inner circumference of the forward end of the integral main gear shaft 50 is grooved at 74. The mid portion of the outer circumference of the coupling shaft 66 has an outward boss 75 which contains a like groove 76. The face of the shaft 50 is slotted at 78 to the depth of the groove 74. Likewise the face of the boss 75 on the coupling shaft 66 is slotted at 80 to a depth of the groove 76. In coupling the members 66 and 50, they are adjusted so that the grooves 74 and 76 are in axial alignment and the slots 78 and 80 are in circumferential alignment. The Spiralox snap ring 72 is then fed through the opening created by the aligned slots 78 and 80 into the aligned grooves 74 and 76. The parts are thus connected axially. It is to be understood that while we have shown two diametrically opposed pairs of slots 78 and 80, two pairs of slots are not necessary. The pairs of slots are utilized for balance purposes only since a single pair of slots is all that is required to make the connection.

As stated above, the sun gear 68 is connected to the coupling shaft 66 which in turn is connected to the main gear 48 which meshes with the pinion gear 20 driven by the input shaft 26. The connection between the annular sun gear 68 and the coupling shaft 66 is accomplished by internal axial splines 82 on sun gear 68 engaging external axial splines 84 on the forward end of the coupling shaft 66. Thus, the sun gear may move axially with respect to the axially fixed coupling shaft 66. The sun gear 68 is radially located by coupling shaft 66 and the main gear shaft 50. The sun gear 68 carries an internal snap ring 86 on the right hand side of splines 84 and a snap ring 87 is carried by the coupling shaft 66 on the left hand side. These snap rings serve as oil puddler abutments and insure sufficient lubrication of the splines 82 and 84 at all times.

The sun gear 68 meshes with a number of planet gears 88 which are rotatably carried on planet gear carrier 90 through roller bearings 92. The planet carrier 90 is rotatably mounted in a thin flexible wall 96 in the following manner. The left end of the housing section 14 has an internal flange 94. A thin, flexible vertical wall 96 is bolted to the forward face of the flange 94 at its outer edge. The thin wall 96 mounts the outer race for a light ball bearing 98. The forward reduced annular end 100 of the planet carrier 90 carries the inner race of the bearing 98 thus journaling the carrier 90 in the thin wall 96.

A forward section 102 on the housing 12 has a heavier vertical wall 104. The vertical wall 104 has a roller bearing 106 mounted therein in axial alignment with the carrier 90, the sun gear 68, and the main gear 48. An output shaft 108 is journaled in bearing 106 with its end portion splined to the carrier 100 through a collar 110. Shaft 108 is located axially by a ball type thrust bearing (not shown). Note that while the collar is fixed axially with respect to the output shaft 108, the spline connection at 109 between the collar and the carrier 90 allows for relative axial movement. The spline connections and the collar 110 are substantially in the plane of the thin wall 96. The output shaft 108 and bearing 106 thus serve to locate the carrier 90 radially while the ball bearing 98 and thin wall 96 locate it axially.

The planet gears 88 also mesh with a ring gear generally indicated at 112. The ring gear 112 comprises two axially spaced rings 114 and 116. Each ring has a circumferential row of internal helical teeth. The teeth on the ring 114 are of opposite lead than the teeth on the ring 116 and thus mesh with and match the herringbone teeth on the planet gears 88. The rings 114 and 116 are separately and independently cantilevered from a mounting collar 118 which is secured to the rear face of the housing flange 94. The thicknesses and the lengths of the cantilever webs on which the rings 114 and 116 are mounted are correlated so that the rings have identical windup under torque loadings. Returning to our oil supply tube 62, it is seen to be supported at its left end in a plain collar 120 carried by an annulus 122 which in turn is carried by and rotatable with the planet carrier 90. The collar 120 in addition to forming an oil plenum 124 provides a bearing surface between the rotating annulus 122 and the stationary tube 62. The annulus 122 has an oil supply passage 126 which connects plenum 124 with spray tubes 128 which direct oil into the gear teeth of the sun and planets. A forward extension 130 splined to tube 62 is disposed within output shaft 108.

The operation of our device should be obvious from the foregoing. Torque is transmitted from the input shaft 26 through to the output shaft 108 through pinion 20, main gear 48, sun gear 68, and carrier 90 which is rotated by the reaction of planet gears 88 on rotating sun gear 68 and the fixed ring gear 112. Note that the above described drive train is fixed axially with respect to the housing 12 at several points. The pinion gear 20 is fixed axially on shaft 26 which in turn is fixed axially by a thrust bearing (not shown). The main gear 48 is fixed axially through the self-alignment feature of the meshing herringbone gears. The ring gear 112 is fixed on the flange 94 through mounting collar 118. While the cantilever method of mounting the individual rings affords some flexibility, the ring gear is essentially axially fixed. Because of the herringbone type gearing, the planets 88 axially align themselves on the ring gear 112. The sun gear 68 is splined to the coupling shaft 66 for limited axial movement and axially aligns itself on the planets 88. The planet carrier 90 which is located radially by the output shaft 108, however, is mounted on the thin, flexible wall 96. Since it is splined to the output shaft and since the thin wall 96 will deflect under loads, the carrier may move axially a slight amount. Since the annular planets 88 serve as the outer race for bearings 92 and have no flanged portions, the planets may move axially with respect to the carrier. This axial movement together with the axial deflection of wall 96 allows the carrier to adjust axially with respect to the planet gears while maintaining the planet gears in engagement and alignment with the ring gear and sun gear. Thus the carrier 90 is movable to accommodate differential thermal expansion or axial adjustment without loading the gear teeth.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

We claim:

1. A planetary gear set comprising, in combination, a housing having a relatively thin, flexible radially disposed wall, a planet carrier member journaled in said wall, a plurality of planet gears rotatably mounted on said carrier, said planet gears being axially movable with respect to said carrier, a ring gear meshing with said planet gears, means mounting said ring gear in said housing coaxially with said planet carrier and in an axially fixed position with respect to said housing, a sun gear meshing with said planet gears, and further means mounting said sun gear in said housing coaxially with said planet carrier and with limited freedom of axial movement with respect to said housing whereby said thin, flexible wall deflects axially to allow said carrier to move axially with respect to said housing without loading the teeth of said gears.

2. The gear set as defined in claim 1 wherein said gears are of the herringbone type.

3. The gear set as defined in claim 2 wherein said ring gear comprises a pair of axially spaced rings, each ring having internal teeth of opposite hand than the teeth of the other ring and each of said rings are independently cantilevered from said mounting means.

4. The gear set as defined in claim 2 including a shaft journaled in said housing concentric with said planet carrier, said shaft being connected to said planet carrier substantially in the plane of said thin, flexible wall.

5. The gear set as defined in claim 3 including a shaft journaled in said housing concentric with said planet carrier, said shaft being fixed axially with respect to said housing and being spline connected to said planet carrier substantially in the plane of said thin, flexible wall, said spline connection allowing relative axial movement between said second shaft and said carrier.

6. The gear set as defined in claim 5 wherein said ring gear is fixed against rotation and said further mounting means includes a second shaft journaled in said housing and spline means mounting said sun gear on said first shaft for limited axial movement.

7. The gear set as defined in claim 6 including a main herringbone gear on said second shaft and a herringbone pinion gear rotatably mounted on an axis parallel to and radially spaced from the axis of said second shaft, said pinion gear being axially fixed with respect to said housing and meshing with said main gear to axially fix said second shaft.

8. The gear set as defined in claim 2 wherein said ring gear is fixed against rotation and said further means includes a shaft journaled in said housing and spline means mounting said sun gear on said shaft and including a main herringbone gear on said shaft and a herringbone pinion gear rotatably mounted on an axis parallel to and radially spaced from the axis of said shaft, said pinion gear being axially fixed with respect to said housing and meshing with said main gear to axially fix said first shaft.

References Cited

UNITED STATES PATENTS 2,936,655  5/1960  Peterson et al. _____ 74—801
3,293,948  12/1966  Jarchon et al. _____ 74—801

DONLEY J. STOCKING, *Primary Examiner.*

J. R. BENEFIEL, *Assistant Examiner.*